G. J. THOMAS.
PIVOTED SUPPORT FOR MOTOR VEHICLES.
APPLICATION FILED JULY 20, 1918.
1,321,491.
Patented Nov. 11, 1919.
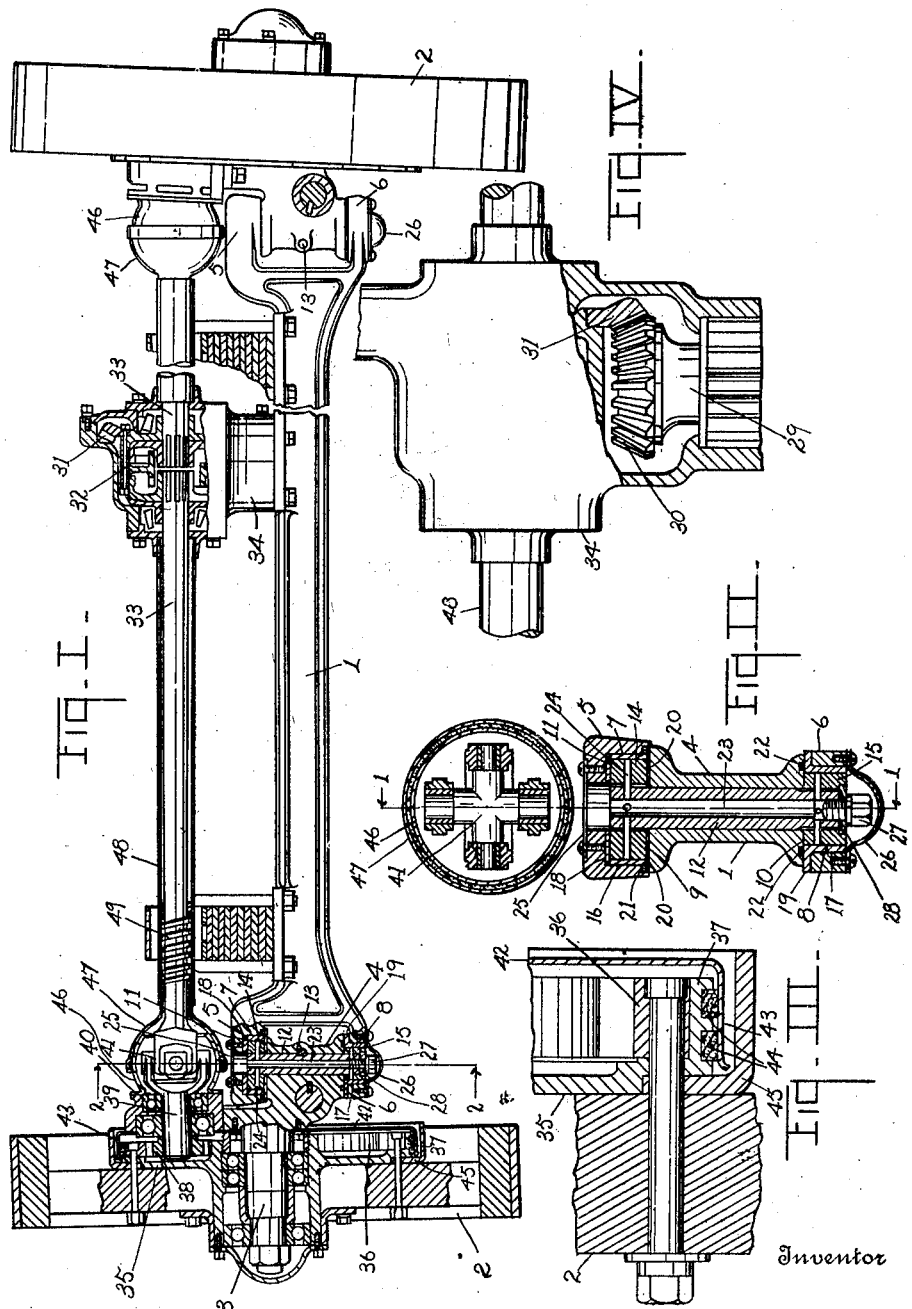
Witnesses
Lern Gilman
M. Louise Thurston
Inventor
George Joseph Thomas
By Chappell & Earl
Attorneys

UNITED STATES PATENT OFFICE.

GEORGE JOSEPH THOMAS, OF LANSING, MICHIGAN, ASSIGNOR TO DUPLEX TRUCK COMPANY, OF LANSING, MICHIGAN.

PIVOTED SUPPORT FOR MOTOR-VEHICLES.

1,321,491.     Specification of Letters Patent.     Patented Nov. 11, 1919.

Application filed July 20, 1918. Serial No. 245,824.

*To all whom it may concern:*

Be it known that I, GEORGE JOSEPH THOMAS, a citizen of the United States, residing at Lansing, county of Ingham, State of Michigan, have invented certain new and useful Improvements in Pivoted Supports for Motor-Vehicles, of which the following is a specification.

This invention relates to improvements in pivoted supports for motor vehicles.

The main objects of this invention are:

First, to provide in a motor vehicle an improved traction wheel driving means.

Second, to provide in a motor vehicle an improved wheel spindle structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is an elevation, partially in vertical central section, of front wheels, axle, and driving connections therefor of a structure embodying the features of my invention.

Fig. II is a vertical section on a line corresponding to line 2—2 of Fig. I.

Fig. III is an enlarged detail section through one of the wheels and the gear and gear housing thereon.

Fig. IV is an enlarged detail plan view, partially in section, showing details of the differential.

In the drawing similar reference characters refer to similar parts throughout the several views, and the sectional views are taken looking in the direction of the little arrows at the ends of the section lines.

Referring to the drawing, 1 represents the front axle and 2 the traction wheels of a motor vehicle. The axle spindles 3 for the wheels are provided with knuckles 4 disposed between knuckle arms 5 and 6 on the axle. The upper knuckle arm is provided with a bearing 7, while the lower arm has a bearing 8. These bearings open through the arms. The upper bearing 7 is shouldered at 11. The knuckle 4 has upper and lower end bearing surfaces 9 and 10 respectively.

A pin 12 is secured in the knuckle 4 by the transverse key 13, so that the pin projects at both ends. On the upper end of the pin is a bearing block 14 and on its lower end, a bearing block 15. The pin is pressed into these blocks so that they are, in effect, when assembled, a part of the pin, the pin, however, may be easily removed as occasion requires.

The bearings 7 and 8 are provided with bushings 16 and 17 respectively. A thrust plate 18 is provided for the shoulder 11, while the lower bushing has a flange-like portion 19 forming a thrust bearing for the lower end bearing surface 10 of the knuckle 4.

A plate 20 is arranged between the block 14 and the upper end 9 of the knuckle 4. A gasket 21 is arranged on the upper arm 7 at the outside of the bushing 16. A gasket 22 is arranged in the lower end bearing surface 10 of the knuckle. The pin has a longitudinal oil passage 23, while the bearing blocks have radial passages 24 communicating with the passage 23.

Caps 25 and 26 respectively, are provided for the bearings 5 and 6. A screw 27 is threaded into the lower end of the pin to engage the washer-like plate 28 disposed in a recess in the end of the lower bearing member 15. By this arrangement of parts I secure a connection for the spindle to the axle, which has large bearing surfaces and at the same time the parts are relatively small.

The propeller shaft 29 has a gear 30 thereon meshing with the driving gear 31 of the differential, which is designated generally by the numeral 32. The driving shafts or jack shafts 33 are driven through this differential, their inner ends being supported by bearings carried by the differential housing or gear box 34. The hub of each wheel is provided with a gear plate 35, having an internal gear 36 secured thereto. This gear plate has a flange 37, the gear being arranged within the flange. A driving pinion 38 is arranged in mesh with the gear 36.

The short pinion shaft 39 is supported by bearings in the bearing support 40, there being two ball bearings within this support in the structure illustrated,—see Fig. I. The pinion shaft is thus supported close to the pinion and also close to the universal joint 41 which connects it to the driving shaft 33.

The bearing support 40 is mounted on the spindle. An inner housing member or plate 42 is mounted on the spindle and provided with a flange 43 embracing the flange 37 of the gear plate. The gear plate 35 has peripheral gaskets 44 thereon with which the flange 43 of the inner housing or closure plate 42 coacts. An annular housing member 45 is mounted on the gear plate to embrace the flange 43. With this arrangement the gears are effectively protected from dust and dirt and lubricant is retained within the housing.

The universal joint is provided with a housing member 46 secured to the bearing support and a coacting spherical housing member 47 having telescoping engagement with the tubular housing 48 for the driving shaft 33. A spring 49 urges the housing member 47 yieldingly toward the housing member 46. With this arrangement all of the bearing parts are effectively incased to exclude dirt and retain lubricant.

I have illustrated and described my improvements as I have embodied them in motor trucks of the four wheel driving type, the axle illustrated being the front axle of such a structure. My improvements are desirable and readily adapted for use in certain other relations, such as rear axles provided with steering wheels, but, as I believe such modifications as would be necessary to such and other adaptations will be understood by those skilled in the art to which my invention relates, I have not illustrated or described the same herein.

Having thus described my invention, what I claim as new and desire to secure by Letters Patent, is:

1. The combination with a wheel, of an axle provided with spaced knuckle arms having bearing openings therethrough, the bearing opening of the upper arm being shouldered, a wheel spindle having a knuckle disposed between said arms and provided with end bearing surfaces, a journal pin keyed to and projecting from said knuckle, bearing blocks on the ends of said pin disposed in said bearings, said pin having a longitudinal and said bearing blocks having radial communicating lubricating passages, bushings for said bearings, a thrust member for the shoulder of the upper bearing and a thrust member between each of the said end bearing surfaces of the knuckle and the adjacent knuckle arm, an annular gasket disposed in the upper knuckle arm at the outside of its bushing to coact with said upper thrust bearing member, an annular gasket disposed in the lower end bearing surfaces of the spindle knuckle to coact with the lower thrust bearing member, and caps for the outer ends of said knuckle arm bearings.

2. The combination with a wheel, of an axle provided with spaced knuckle arms having bearing openings therethrough, the bearing opening of the upper arm being shouldered, a wheel spindle having a knuckle disposed between said arms and provided with end bearing surfaces, a journal pin keyed to and projecting from said knuckle, bearing blocks on the ends of said pin disposed in said bearings, said pin having a longitudinal and said bearing blocks having radial communicating lubricating passages, bushings for said bearings, a thrust member for the shoulder of the upper bearing and a thrust member between one of the said end bearing surfaces of the knuckle and the adjacent knuckle arm, and caps for the outer ends of said knuckle arm bearings.

3. The combination with a wheel, of an axle provided with spaced knuckle arms having bearing openings therethrough, the bearing opening of the upper arm being shouldered, a wheel spindle having a knuckle disposed between said arms, a journal pin keyed to and projecting from said knuckle, bearing blocks on the ends of said pin disposed in said bearings, said pin having a longitudinal and said bearing blocks having radial communicating lubricating passages, and caps for the outer ends of said knuckle arm bearings.

4. The combination with a wheel, of an axle provided with spaced knuckle arms having bearing openings therethrough, the bearing opening of the upper arm being shouldered, a wheel spindle having a knuckle disposed between said arms and provided with end bearing surfaces, a journal pin keyed to and projecting from said knuckle, bearing blocks on the ends of said pin disposed in said bearings, and bushings for said bearings, a thrust member for the shoulder of the upper bearing and a thrust member between one of the said end bearing surfaces of the knuckle and the adjacent knuckle arm.

5. The combination with a wheel, of an axle provided with spaced knuckle arms having bearing openings therethrough, a wheel spindle having a knuckle disposed between said arms, a journal pin keyed to and projecting from said knuckle, bearing blocks on the ends of said pin disposed in said bearings, said pin having a longitudinal and said bearing blocks having radial communicating lubricating passages, and caps for the outer ends of said knuckle arm bearings.

6. The combination with a wheel, of an axle provided with spaced knuckle arms having bearing openings therethrough, a wheel spindle having a knuckle disposed between said arms, a journal pin keyed to and projecting from said knuckle, and bearing blocks on the ends of said pin disposed in said bearings.

7. The combination with an axle, a pivoted wheel spindle, a wheel provided with a hub having a flanged gear plate thereon constituting a housing member, a gear secured within the flange of said gear plate, a pinion meshing with said gear, a pinion shaft, a bearing support provided with a bearing for said pinion shaft mounted on said spindle, a driving or jack shaft, a universal joint connecting said driving and pinion shafts and alined with the pivot of said spindle, a housing plate mounted on said spindle and having a peripheral flange, a tubular housing for said jack shaft, a universal joint housing member secured to said bearing support, a coacting joint housing member having telescoping engagement with said jack shaft housing, and a spring acting on said second joint housing member to urge it outwardly.

8. The combination with an axle, a pivoted wheel spindle, a wheel provided with a hub having a flanged gear plate thereon constituting a housing member, a gear secured within the flange of said gear plate, a pinion meshing with said gear, a pinion shaft, a bearing support provided with a bearing for said pinion shaft mounted on said spindle, a driving or jack shaft, a universal joint connecting said driving and pinion shafts and alined with the pivot of said spindle, a housing plate mounted on said spindle and having a peripheral flange, and an annular housing member secured to said gear plate embracing the flange of said housing plate.

9. The combination with an axle, a pivoted wheel spindle, a wheel provided with a hub having a flanged gear plate thereon constituting a housing member, a gear secured within the flange of said gear plate, peripheral gaskets on said flange, a pinion meshing with said gear, a pinion shaft, a bearing support provided with a bearing for said pinion shaft mounted on said spindle, a driving or jack shaft, a universal joint connecting said driving and pinion shafts and alined with the pivot of said spindle, a housing plate mounted on said spindle and having a peripheral flange embracing the flange of said gear plate and coacting with said gaskets carried thereby, and an annular housing member secured to said gear plate embracing the flange of said housing plate.

10. The combination with an axle, a pivoted wheel spindle, a wheel provided with a hub having a flanged gear plate thereon constituting a housing member, a gear secured within the flange of said gear plate, a pinion meshing with said gear, a pinion shaft, a bearing support provided with a bearing for said pinion shaft mounted on said spindle, a driving or jack shaft, a universal joint connecting said driving and pinion shafts and alined with the pivot of said spindle, a housing plate mounted on said spindle and having a peripheral flange coacting with the flange of said gear plate, and an annular housing member secured to said gear plate embracing the flange of said housing plate.

11. The combination with an axle, a pivoted wheel spindle, a wheel, a gear secured to said wheel, a pinion meshing with said gear, a pinion shaft, a bearing support provided with a bearing for said pinion shaft mounted on said spindle, a driving or jack shaft, a universal joint connecting said driving and pinion shafts and alined with the pivot of said spindle, a tubular housing for said jack shaft, a universal joint housing member secured to said bearing support, a coacting joint housing member having telescoping engagement with said jack shaft housing, and a spring acting on said second joint housing member to urge it outwardly.

In witness whereof, I have hereunto set my hand in the presence of two witnesses.

GEORGE JOSEPH THOMAS.

Witnesses:
H. M. LEE,
G. W. HEWITT.